United States Patent [19]

Basmajian

[11] Patent Number: 4,566,532
[45] Date of Patent: Jan. 28, 1986

[54] GEOTHERMAL HEAT TRANSFER

[75] Inventor: Vahan V. Basmajian, Concord, Mass.

[73] Assignee: Megatech Corporation, Billerica, Mass.

[21] Appl. No.: 540,693

[22] Filed: Oct. 11, 1983

Related U.S. Application Data

[63] Continuation of Ser. No. 248,964, Mar. 30, 1981, abandoned, which is a continuation-in-part of Ser. No. 948,760, Oct. 5, 1978, abandoned.

[51] Int. Cl.$^4$ ............................................. F24J 3/02
[52] U.S. Cl. ................................. 165/45; 60/641.2; 62/260; 165/108; 165/160
[58] Field of Search .................. 165/45, 108, 160; 62/260; 166/303; 60/641.2, 641.4

[56] References Cited

U.S. PATENT DOCUMENTS

| | | | |
|---|---|---|---|
| 1,981,730 | 11/1934 | Hawkins | 165/45 |
| 2,007,406 | 7/1935 | Miller | 62/260 X |
| 2,217,190 | 10/1940 | Urquhart | 165/45 |
| 2,554,661 | 5/1951 | Clancy | 165/45 |
| 3,155,160 | 11/1964 | Craig, Jr. et al. | 166/303 |
| 3,183,675 | 5/1965 | Schroeder | 165/45 |
| 3,274,769 | 9/1966 | Reynolds | 165/45 X |
| 3,455,387 | 7/1969 | Peters | 166/278 |
| 3,857,244 | 12/1974 | Faucette | 165/45 X |
| 3,884,301 | 5/1975 | Turner et al. | 166/278 |
| 3,986,558 | 10/1976 | Dufour | 166/303 |
| 4,010,731 | 3/1977 | Harrison | 126/400 X |
| 4,037,583 | 7/1977 | Bakun et al. | 126/400 X |
| 4,042,012 | 8/1977 | Perry et al. | 165/45 |
| 4,094,356 | 6/1978 | Ash et al. | 165/39 |
| 4,138,995 | 2/1979 | Yuan | 126/271 |
| 4,140,176 | 2/1979 | Essebaggers | 165/160 X |
| 4,142,108 | 2/1979 | Matthews | 60/641 X |
| 4,220,202 | 9/1980 | Aladiev et al. | 165/45 X |
| 4,277,946 | 7/1981 | Bottum | 62/260 X |
| 4,325,228 | 4/1982 | Wolf | 62/260 |
| 4,357,989 | 11/1982 | Holzle | 165/45 |

FOREIGN PATENT DOCUMENTS

| | | | |
|---|---|---|---|
| 59350 | 2/1912 | Switzerland | 165/45 |
| 257661 | 10/1948 | Switzerland | 165/45 |
| 1326458 | 8/1973 | United Kingdom | |

Primary Examiner—Sheldon J. Richter
Attorney, Agent, or Firm—Charles Hieken

[57] ABSTRACT

A vertical heat exchanger has a vertical inner conduit surrounded by an outer casing formed with ports with a piercing nosecone at the bottom for facilitating insertion into the earth. The space between the inner conduit and outer casing includes a conductive fill and receives water or salinated fluid through a control valve thus saturating the area surrounding the outer casing. Alternatively, the vertical conduit containing the heat exchanging fluid may be arranged parallel to one or more vertical injector pipes formed with ports for injecting water or salinating fluid through a control valve into the region adjacent to the conduit.

12 Claims, 3 Drawing Figures

GEOTHERMAL HEAT TRANSFER

REFERENCE TO PRIOR APPLICATION

This is a continuation of abandoned application Ser. No. 248,964, filed Mar. 30, 1981, abandoned, which is a continuation-in-part of abandoned application Ser. No. 948,760 filed Oct. 5, 1978.

The present invention relates in general to geothermal heat transfer and more particularly concerns novel apparatus and techniques for efficiently exchanging heat with the earth to provide both heating and cooling in a cost effective heat pump system. The invention takes advantage of the always available geothermal energy in the earth that is essentially independent of weather.

A heat pump typically comprises a compressor that takes refrigerant vapor from a low-pressure, low-temperature evaporator and delivers it at high pressure and temperature to a condensor as is customary with a vapor-compression refrigeration system. A heat pump may use the same equipment to cool the conditioned space in summer and to heat it in winter by placing the low-temperature evaporator in the conditioned space during the summer and the high-temperature condensor in the same space during the winter. Appropriate valves may be used to change the direction of flow of heat-exchanging fluid between operation for cooling and heating.

The equipment must be of the correct size to provide both proper cooling and heating. In general the heating and cooling loads are different with the heating load in the temperature zone usually being greater than the cooling load. As a result, prior art heat pump systems have typically required a large high horsepower compressor fitted to the heating demand and a supplementary heating system or a heat storage system. If well water or the ground serves as the heat source, the imbalance is less severe than when air is the source. However, typical ground coils are buried only a few feet in the ground and horizontally oriented with poor coupling to the ground resulting in uncertain heat transfer rates with the ground coil. Another disadvantage of laying coils horizontally is the costly installation requiring removal of considerable earth resulting in damage to shrubs, trees and the surrounding area. And the physically large air heat exchangers are unsightly and occupy useable living space. And the impurities, quality, quantity and disposal of water, and the erosion problems have resulted in problems with water and ground air sources, and air is typically the preferable heat source for prior art systems.

It is an important object of this invention to provide an improved geothermal energy transfer system.

It is a further object of the invention to achieve the preceding object by establishing good thermal coupling to an in-ground heat source that is always available independently of weather.

It is a further object of the invention to achieve one or more of the preceding objects and to increase the effective thermal conductivity of the soil near the metallic heat exchanger by injecting water or other conductive compounds surrounding the heat exchanger. Because of cylindrical symmetry with effective area increasing outward, the region near the heat exchanger is most important.

It is a further object of the invention to achieve one or more of the preceding objects and to protect the refrigerant tubes from external mechanical damage while driving or setting the well pipes.

It is another object of the invention to achieve one or more of the preceding objects while keeping installation costs relatively low and occupying negligible horizontal area.

It is still another object of the invention to achieve one or more of the preceding objects with a compact system having negligible portions visible.

It is still another object of the invention to achieve one or more of the preceding objects with a system that may be completely invisible from the outside.

SUMMARY OF THE INVENTION

According to the invention, there is heat exchange means vertically or slant-mounted in the earth, preferably at an angle with the vertical of less than 45°, and means for increasing the thermal conductivity between the heat exchanging means and the earth. The heat exchanging means typically comprises a vertical conduit, and the means for increasing thermal conductivity comprise salinated or other thermally conductive material adjacent the conduit, such as brass or copper pellets, or cupro nickle there preferably being means for injecting water, salinated or other thermally conductive fluid in the region adjacent the conduit. According to one aspect of the invention, an outer casing surrounds the conduit and is formed with ports for releasing water, salinated or other thermally conductive fluid to the region outside the outer casing, and the region between the inner and outer casing contains a metallic or other thermally conductive fill. Salinated or other thermally conductive fluid is injected into the region between the conduit and the outer casing. Preferably, there is a piercing nosecone at the bottom of the conduit-casing assembly for facilitating insertion into the earth.

According to another aspect of the invention, one or more injector pipes seated in the earth generally parallel to the conduit and formed with ports facing the conduit receive salinated or other thermally conductive fluid and eject the fluid into the region adjacent the conduit.

Numerous other features, objects and advantages of the invention will become apparent from the following specification when read in connection with the accompanying drawing in which:

DETAILED DESCRIPTION OF PREFERRED EMBODIMENTS

Figure 1:
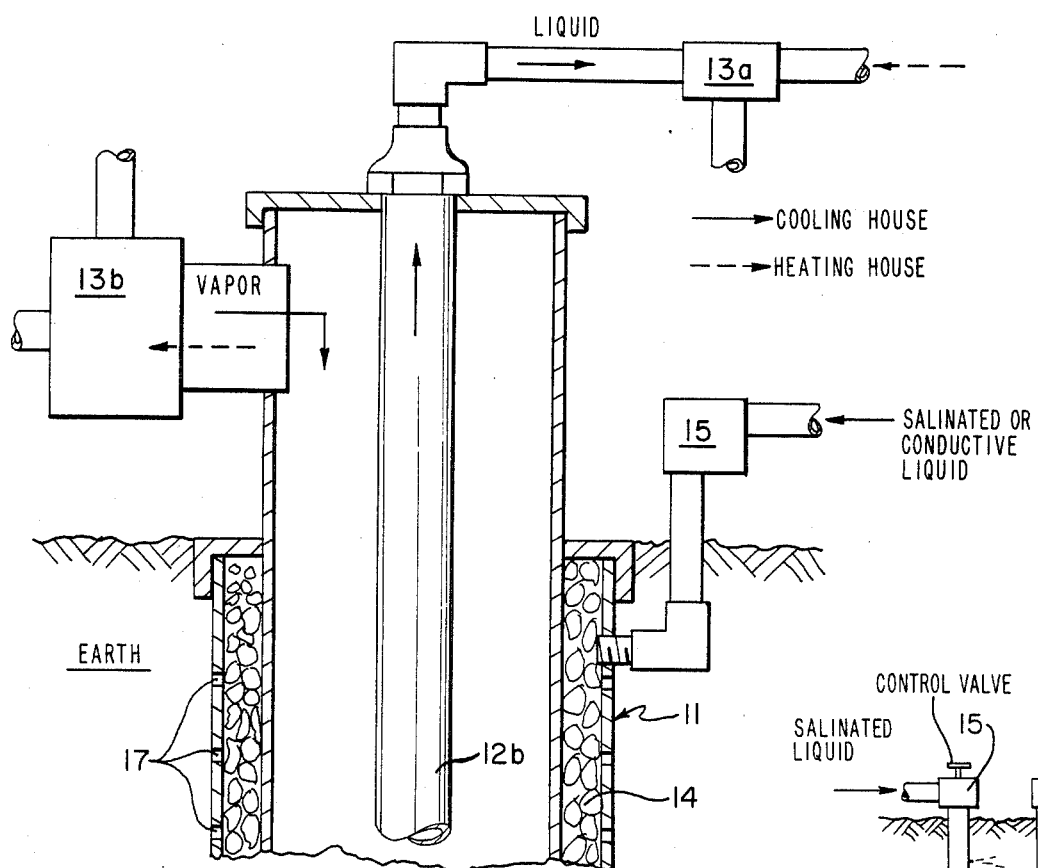
FIG. 1 is a diagrammatical representation, partially in section, of an embodiment of the invention in which an outer casing surrounds the heat exchanging conduit.
Figure 1:
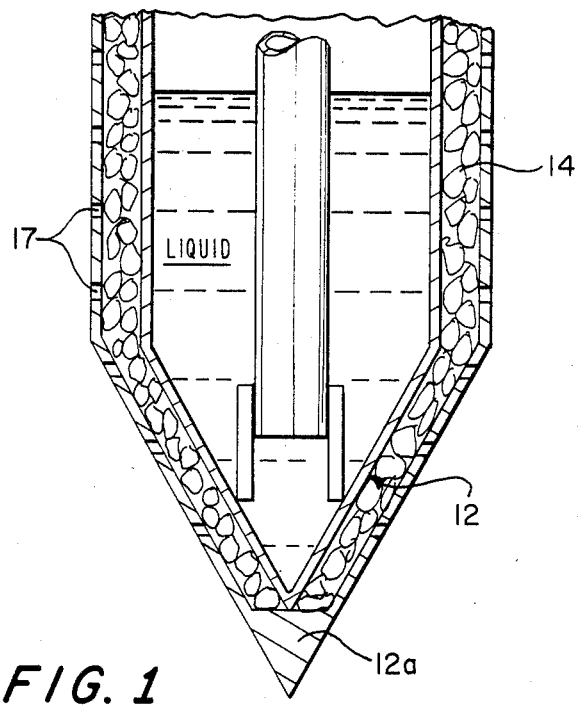

With reference now to the drawing and more particularly FIG. 1 thereof, there is shown a diagrammatical representation, partially in section, of an embodiment of the invention. An outer casing 11 having a piercing nosecone 12a to facilitate insertion is seated vertically in the earth to a depth of 20 feet or more. A heat exchanging conduit 12 is centered inside casing 11 and may function as a condenser for cooling and an evaporator for heating. Outer casing 11 and conduit 12 comprise cylindrical heat exchanging means of length much greater than diameter oriented in the earth at an angle with the vertical of less than 45° for exchanging energy with the earth and of uniform outside wall diameter along most of its length and free of protrusions extending radially outward from the outside wall. Conduit 12, which may be copper or other suitable thermally conducting material, circulates working fluid that enters and exits through a control valving system having liquid and vapor conduits 13a and 13b, respectively, one being typically coupled to a heat pump compressor and the other to a liquid receiver, depending upon whether the system is then functioning for heating or cooling (broken and solid arrows respectively indicating flow) in a conventional manner that is well-known in the art and not further described here to avoid obscuring the principles of the invention. Central tube 12b carries the liquid which surrounds the bottom of tube 12b.

The region 14 between conduit 12 and outer casing 11 carries porous metallic fill such as copper or cupro nickel granules and also receives water/salinated fluid through injection control valve 15 that is released through ports such as 17 disposed along the outer casing 11 to spray the region around outer casing 11 with said fluid that establishes good thermal contact between heat exchanging conduit 12 and the surrounding earth.

Figure 2:
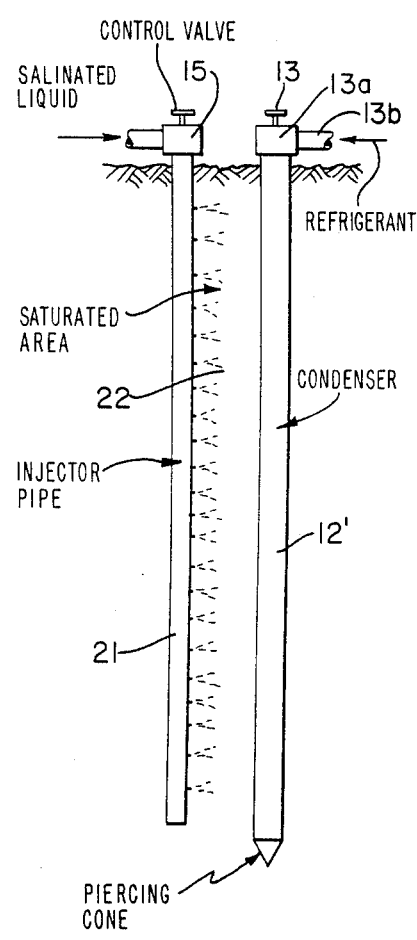
FIG. 2 is a diagrammatical representation, partially in section, of another embodiment of the invention with an injector pipe parallel to the heat exchanging conduit.

Referring to FIG. 2, there is shown a diagrammatical representation, partially in section, of an alternative embodiment of the invention in which heat exchange conduit 12' is near one or more parallel injector pipes, such as 21 formed with ports such as 22 facing conduit 12' to saturate the region between injector pipe 21 and conduit 12' with salinated or other thermally conductive fluid that increases the thermal conductivity between the earth and heat exchange conduit 12'.

The invention has a number of advantages. Geothermal energy is constantly available and independent of weather conditions and is virtually free of environmental problems. The source temperature variation is slight. At a depth of twenty feet at 45° latitude, for all seasons the temperature variation is less than 10° F. (5.6° C.). Furthermore, the invention embodies a practical design which may be used at any point inside or outside of a building. In fact the invention is especially advantageous when inserted below a cellar because the initial penetration is already below ground level by the depth of the cellar.

The invention increases the thermal conductivity between heat exchanging conduit and the surrounding earth and eliminates the great variance of soil properties. It offers a better heat transfer path with the heat exchanging conduit. Waste water from any source may be injected through control valve 15 and may function to provide additional heat energy for the heat exchange conduit when absorbing heat and may function to receive heat when the system is operating in the cooling mode. The waste water may, for example, be from showers or baths, laundries, dishwashers or other sources.

The heat exchanger according to the invention can withstand ground shocks without damaging the inner conduit. Installation is relatively easy and inexpensive by using conventional well or other drilling equipment to position the outer casing and then installing the inner conduit.

Preferred minimal thermal conductivities for the various elements in BTU/hour/foot$^2$/degree F./foot for outer casing 11 is 20, for fill 14, 70 with 100–200 preferred, 200 for central tube 12b and 0.3 for the injected fluid.

Figure 3:
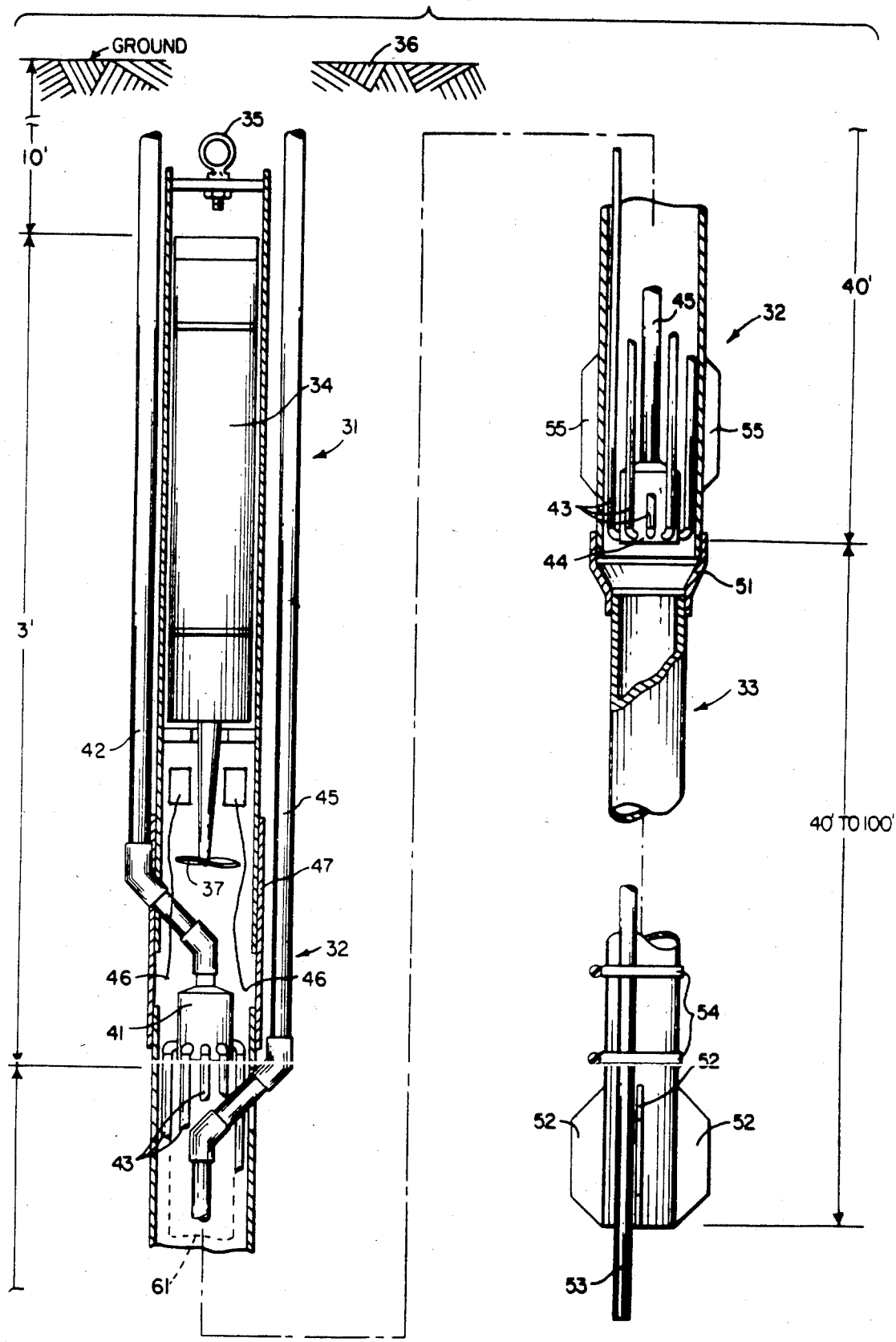
FIG. 3 is a fragmentary serpentine axial view partially in section of a preferred embodiment of the invention.

Referring to FIG. 3, there is shown a view partially in section with portions cut away and lower portions displaced to the left of the upper portion illustrating another embodiment of the invention especially suitable for insertion in wet underground holes. This embodiment includes an upper section 31, an intermediate section 32 and a lower section 33. Upper section 31 carries pump motor 34 and depends from an eye-bolt 35 secured to a brass plate 38 that may be used for lowering the structure into and raising it from the hole bored in the ground. The top of pump 34 is typically a few feet below the water level. A propeller 37 depends from pump motor 34 and functions to help keep the ground water circulating to provide effective heat transfer. The intermediate section 32 includes an upper distributor 41, that exchanges freon with pipe 42 and exchanges freon with eight smaller diameter copper pipes such as 43 that are typically forty-feet long and exchange the freon with lower distributor 44. Distributor 44 exchanges the freon with pipe 45 for exchange with the heat exchanging apparatus in the space to be heated and/or cooled. Upper section 31 is formed with slots 46 comprising port means for admitting water to a level that extends to a height typically just above propeller blade 37.

Upper section 31 is joined to intermediate section 32 by a support sleeve 47. Intermediate section 32 is joined to lower section 33 by PVC reducer 51. The end of lower section 33 carries three guide fins 52 spaced 120° about the axis and a depth limiter rod 53 strapped to lower section 33 by straps 54. Three PVC guide fins, two of which 55, are visible, are also attached to the lower end of intermediate section 32. Additional guide fins 52 and 55 not shown should be spaced as needed along the various sections to provide spacing in the hole.

The specific embodiment shown in FIG. 3 is especially suitable for insertion into a six-inch diameter hole with upper and intermediate sections 31 and 32 being four-inch PVC air duct and lower section 33 being three-inch diameter PVC air duct. Pipes 42 and 45 are typically $\frac{7}{8}$" copper refrigerator tubing and hard solder is used on all freon system joints in accordance with customary practice.

In an alternative embodiment of the invention for insertion into an eight-inch hole, upper section 31 may be substantially the same; however, intermediate section 32 may comprise six-inch diamter PVC air duct and the $\frac{3}{8}$" copper pipes 43 may be soldered to a 40-foot-long steel tube axially along its outer diameter, generally indicated by the broken lines 61 in FIG. 3. Lower section 33 may then be four-inch diameter PVC air duct with reducer 51 being a six-inch to four-inch PVC reducer.

Since the principal barrier to heat transfer in the earth is the low conductivity of soil, the embodiments of FIGS. 1 and 2 help increase the exchange of heat with the earth and increasing the effectiveness of the freon heat exchanger without increasing its length. This is a major advantage since excessive length in the freon exchange unit increases piping losses and cost.

In an area where there is ground water, a hole of up to 250 feet depth may be drilled and water allowed to fill the hole. Consider a situation where the water level is 20 feet from the surface. A freon heat exchanger having a smaller outside diameter lowered inside the hole as shown in FIG. 3 allows vertical convection of water in the hole as a temperature gradient develops. The convection allows circulation of large amounts of water at low velocity so that a relatively small temperature rise is needed. This significantly enhances the efficiency of the heat pump and motor 34 driving propeller 37 further enhances this convection. Since the water is not removed from the ground, the system uses negligible pumping energy. Furthermore, because water carries the heat, the freon pipes need not extend to the bottom of the hole, and the pressure loss associated with lifting the freon back to the surface is relatively small.

Using lightweight low-cost PVC pipe helps keep costs relatively low and prevents regenerative heat exchange between the inner cooled water and outer warmer water. The ducts comprising the intermediate section 32 and lower section 33 support the copper freon tubes 43 and extend to the bottom of the hole for directing the cooled water from which heat has been removed back to the bottom where it can be warmed by the earth as it rises up the outer channel around the hollow conduit comprising these ducts. This also prevents stratification of the formation of convection cells both of which would increase. These ducts guide the cooled water downward after heat is extracted.

In a vertical hole of length much greater than diameter the cooler water may not fall automatically to the bottom. Instead, it may stratify, that is, remain stationary because thermal buoyancy is not sufficient to overcome friction in the long pipe without a guide from the inner pipe. This statification is likely because the density of water at about 39° F. is at a relative maximum; therefore, there is only a very small change in density with temperature. Alternatively, it may instead establish convection cells. When temperature density differences are large enough to start the water circulating in the hole, the resulting currents do not fill the entire hole, but form cells of length a few times the hole diameter. Water circulates in each of these cells and transfers heat from adjacent cell to adjacent cell. This requires a larger temperature difference than if the water is moved to the bottom with duct end propeller 37.

Temperature drops should be as small as possible because the warmer the freon unit is, the higher the coefficient of performance will be. The heat pump works against this temperature difference and must do more work (draw more electricity) for larger temperature differences. An important advantage of the invention over air-to-air heat pumps is that this temperature difference is less because the temperature in the ground is normally higher than the winter air temperature.

Although motor 34 and propeller 37 induce additional circulation, this apparatus is not mandatory because the difference in density caused by heating or cooling will produce convection currents in the water. Because the area of duct pipes 32, 33 are large, small differences in density will cause a large mass of water to circulate and transfer heat from the bottom of the hole with minimum loss. Motor and propeller will, however, increase the operating efficiency in the 35° to 45° range where density changes are very small.

This embodiment has a number of advantages. It is superior to heat exchangers that pump water in and out because the flow rate is much larger and the pumping energy much less. Thus, very low temperature differences can be obtained with relatively high ratio of heat exchanged to energy required to effect the exchange. It is unnecessary to inject salinated or other fluid except to add water as the hole dries out. The entire apparatus may be conveniently removed for servicing as needed by pulling on eyelet 35. The light weight PVC ducts results in relatively little lifting force being required. The parallel copper freon tubes present a relatively large heat exchanging area with the water and may be plain tubes or surface enhanced types that are known, such as those carrying fins. The use of copper and PVC where practical helps to insure a relatively long life because both materials are highly resistant to corrosion in the earth.

An actual embodiment of the invention having eight $\frac{3}{8}''$ diameter copper tubes soldered to the outside of a 5" outer diameter round steel tubing and 4" square tubing for the lower section manifolded to $\frac{7}{8}''$ O.D. freon tube 42 and 45 connected to the heat pump and placed in a vertical six-inch diameter bore hole with the inside filled with fine steel shot produced the following results:

(1) Produced a coefficient of performance (C.O.P.) based on measured data as follows:

DATA
(1) Power Input to Compressor—3 phase
   Amps = 15
   Volts = 200 a.c.
(2) Freon Temperature
   Tcondenser = 80° F.
   Tcompressor = 100° F.
(3) Freon Flowrate = 13.53 lbs/min.
   Upon calcuating the energy Input and Output
   (detailed procedure not shown)
   $E_{Output}$ = 16.233 Btu/sec. = 17.045 Kw
   $E_{Input}$ = 4.156 Kw
   1 Btu/sec. = 1.05 Kw
   Therefore C.O.P. = 4.10

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Geothermal heat transfer apparatus comprising,
   heat exchanging means for orientation in the earth below ground substantially vertically and having a hollow conduit of length from top to bottom much greater than the span across said hollow conduit orthogonal to its length having a top portion near said top, bottom portion near said bottom and an intermediate portion contiguous and communicating with said top and bottom portions for allowing thermally conductive fluid to flow freely between said top, intermediate and bottom portions for immersion in thermally conductive fluid in the region around said heat exchanging means for increasing the heat flow between the latter and earth when inserted into a substantially vertical borehole in the earth with said top portion above said bottom portion, said heat exchanging means comprising heat exchanging conduit means in said intermediate portion for carrying refrigerant, said heat exchanging conduit means comprising a plurality of tubes of thermally conductive material for carrying said refrigerant and extending along the length of said hollow conduit for a tube length that is less than said length of said hollow conduit.

said hollow conduit being formed with port means between said top and said plurality of tubes for allowing said thermally conductive fluid to pass in a flow path embracing said plurality of tubes, said bottom portion, an outer channel around said hollow conduit and said port means.

2. Geothermal heat transfer apparatus in accordance with claim 1 and further comprising, propeller means inside said hollow conduit above said plurality of tubes for moving said thermally conductive fluid along the axis of said hollow conduit, and motor means for rotating said propeller means.

3. Geothermal heat transfer apparatus in accordance with claim 1 and further comprising, means for moving said thermally conductive fluid along the axis of said hollow conduit for reducing the temperature difference of said thermally conductive fluid along said axis.

4. Geothermal heat transfer apparatus in accordance with claim 1 wherein the length of said bottom portion is at least equal to said tube length.

5. Geothermal heat transfer apparatus in accordance with claim 1 wherein said tubes are made of conducting metal having a length many times greater than the largest cross sectional dimension of each and that of the cross sectional area of said hollow conduit embracing said tubes.

6. Geothermal heat transfer apparatus in accordance with claim 5 and further comprising, first and second refrigerant tubes for carrying said refrigerant between said conducting tubes and space to be heated and/or cooled, manifold means to which said metal conducting tubes are connected for transferring said refrigerant between said conducting tubes and said first and second refrigerant tubes.

7. Geothermal heat transfer apparatus in accordance with claim 6 wherein said refrigerant tubes extend outside and parallel to said hollow conduit above said manifold means.

8. Geothermal heat transfer apparatus in accordance with claim 6 wherein said manifold means comprises an upper manifold and a lower manifold, said plurality of tubes being connected between said upper manifold and said lower manifold, said first and second refrigerant tubes connected to said upper and lower manifolds respectively, the diameter of each of said refrigerant tubes being greater than that of each of said plurality of tubes.

9. Geothermal heat transfer apparatus in accordance with claim 8 wherein said first and second refrigerant tubes extend adjacent to and outside said hollow conduit above said upper manifold.

10. Geothermal heat transfer apparatus in accordance with claim 9 and further comprising, electromechanical circulating means inside said conduit between said upper manifold and said top for producing an axial flow of said thermally conducting fluid inside said conduit.

11. Geothermal heat transfer apparatus in accordance with claim 10 and further comprising, earth surrounding a bore in which said hollow conduit is seated with the bottom of said conduit slightly above the bottom of said bore, said thermally conducting fluid being water, water in said bore extending from the bottom thereof to a level above that of said electromechanical circulating means and inside said hollow conduit in thermal contact with both the earth around said bore and said plurality of tubes for exchanging heat through said water between said earth and said refrigerant, said electromechanical circulating means establishing flow of said water along said flow path.

12. Geothermal heat transfer apparatus in accordance with claim 11 and further comprising fin means extending radially outward from said hollow conduit for spacing said conduit from said earth, the radial width of said fin means being less than the diameter of said hollow conduit.

* * * * *